United States Patent [19]

Costopoulos et al.

[11] Patent Number: 4,659,385

[45] Date of Patent: Apr. 21, 1987

[54] BUILDING MATERIAL MANUFACTURING FROM FLY ASH

[76] Inventors: Nick G. Costopoulos; H. Kent Newhouse, both of P.O. Box 248, Lingle, Wyo. 82223

[21] Appl. No.: 410,389

[22] Filed: Aug. 23, 1982

[51] Int. Cl.$^4$ .................................................. C04B 7/35
[52] U.S. Cl. ........................................ 106/87; 106/88; 106/DIG. 1
[58] Field of Search ..................... 106/87, 88, DIG. 1

[56] References Cited

U.S. PATENT DOCUMENTS

| | | | |
|---|---|---|---|
| 3,625,723 | 12/1971 | Sicka | 106/87 |
| 3,700,470 | 10/1972 | Barton | 106/75 |
| 3,702,257 | 11/1972 | Koning | 106/288 B |
| 3,852,084 | 12/1974 | Webster | 106/118 |
| 3,901,991 | 8/1975 | Harutoshi et al. | 428/446 |
| 3,991,005 | 11/1976 | Wallace | 260/38 |
| 4,210,457 | 7/1980 | Dodson et al. | 106/97 |
| 4,214,911 | 7/1980 | Siejko et al. | 106/87 |
| 4,229,329 | 10/1980 | Bennett | 260/17 R |
| 4,257,815 | 3/1981 | Hauser | 106/98 |
| 4,282,036 | 8/1981 | Finsterwalder et al. | 106/97 |

FOREIGN PATENT DOCUMENTS 50-13297   5/1975   Japan ..................................... 106/87

OTHER PUBLICATIONS

Valore, R. C. Jr., "Insulating Concretes" *ACI Journal*, Nov. 1956, pp. 509–532, at 513.
ACI Committee 523, "Guide for Cast—in—Place Low Density Concrete," *ACI Journal*, Sep. 1967, pp. 529–534.
ACI Committee 523, "Guide for Cellular Concretes, etc." *ACI Journal*, Feb. 1975, pp. 50–66.

*Primary Examiner*—William R. Dixon, Jr.
*Assistant Examiner*—Steven Capella
*Attorney, Agent, or Firm*—James R. Young

[57] ABSTRACT

Fly ash combined with a bonding agent, an air entrainer, water, and a foaming agent which forms gas as a result of a chemical reaction within the mixture; allowed to foam and harden, produces a material that is relatively strong and light, has good structural strength, and is resistant to fire, freezing, and thermal shock. Since the major component, fly ash, is a waste product, the material is also inexpensive, and can help alleviate a waste disposal problem. The composition can be handled and fabricated much like concrete, and standard concrete components can be used to modify its strength, setting time, density, color, and water reistance. It may also be formed or crushed for use as a light weight aggregate.

8 Claims, No Drawings

BUILDING MATERIAL MANUFACTURING FROM FLY ASH

BACKGROUND OF THE INVENTION

1. Field of Invention

This invention relates generally to cementitious building materials. More specifically, it relates to a light-weight cementitious building material composition and method of making such a material.

2. State of the Prior Art

Concrete is, of course, a well-known cementitious building material that has had great utility in construction for many years. Concrete is generally considered to be a composition comprised of Portland cement, sand, aggregate, and water. Often an air entraining agent is used to trap small bubbles of air in the mixture to minimize the deleterious effects of freeze/thaw cycles. In addition, a bonding agent can be used to increase the structural strength of the material, as well as to enhance bonding of the material to the aggregate, reinforcing steel, and the like. Portland cement is a generic term for a hydraulic-setting cement material, the principle active constituent of which is powdered or pulverized calcium silicate.

The powdered calcium silicate reacts with water to harden into a solid mass of cementitious material. The sand, i.e., silicon dioxide ($SiO_2$), and aggregate provide the bulk fill material of the concrete that is solidly bound together by the hardened Portland cement (calcium silicate) to form the hard, solid concrete building material.

One of the problems with concrete, at least for many applications, is that it is very heavy. Thus, much of the structural strength designed into concrete structures must be to support the concrete load itself. Also, concrete is not a very effective insulator, thus concrete building structures require extra insulation for effective heat and energy control.

There have been developments of more light-weight concrete. One approach to reducing the weight of concrete is to use lighter weight filler material or aggregate. U.S. Pat. No. 4,214,911, issued to J. Siejko, et al, is an example of this kind of light weight concrete, wherein the sand fraction of the waste material of combustion of brown coal is dry ground (i.e., pulverized cinder blocks) and used as a substitute for sand. The pulverized cinder blocks are mixed with cement and hot (50° C.) water, and a pore-producing material (i.e., foaming agent) is added.

The U.S. Pat. No. 3,625,723, issued to R. Sicka discloses another method of producing a light-weight insulating ceramic material. Sicka's process also utilized calcium silicate (i.e., Portland cement) as the hydraulically setting cement bonding material with fly ash derived from combustion of pulverized coal as an inexpensive filler material. Sicka also discloses the use of wallsonite, magnesium silicate, and zircon as suitable fillers.

Other well-known light weight concrete materials are made by substituting light weight aggregate, such as volcanic ash or vermiculite in place of the heavier rock aggregates used in conventional concrete. Such light weight concretes, however, have less compressive strengths than conventional concrete.

As noted in the above-referenced Sicka and Siejko, et al, patents the abundance of inexpensive fly ash has attracted attention for its potential uses in construction materials in recent years.

Fly ash is a relatively common waste product of coal fired installations, and as such is available in certain locations at very low cost. This availability and low cost has resulted in numerous proposals to use fly ash as a building material.

Some of the proposed uses have been as a component in concrete, either by adding the fly ash to the concrete mix, or by first treating it in some manner. The treatment processes include classifying, heating, crushing, pelletizing, and forming the fly ash into an aggregate such as in the Sicka and Siejko et al patents referenced above. The U.S. Pat. No. 3,852,084 issued to W. Webster and the Japanese Pat. No. 1970-51512 (Public Patent Request Notice 50-13297) to Nippon Peroxide Co. are additional examples of such uses in which fly ash is used with pulverized lime or cement. Some other proposed uses for fly ash include binding it together into shapes, panels, or other articles by using various adhesives, or using it in fire resistant coatings. Most of these materials use a bonding process that depends on either pretreatment of the fly ash, or use of an adhesive that drives up the cost of the finished product, destroying much of the cost advantage of the raw material.

U.S. Pat. No. 3,700,470 issued to P. Barton is of interest in that it achieved the production of a foamed ceramic material utilizing fly ash without Portland cement, calcium silicate, or crushed lime. However, Barton's process requires heat, along with an amphoretic metal, such as aluminum, lead, tin, or chromium, which is capable of reacting as an acid or as a base, in order to achieve the desired curing and other properties.

U.S. Pat. No. 3,700,470 discloses a foamed composition for use in insulating wallboards, comprising fly ash or other materials in combination with powdered metal, water, and sodium silicate, which is molded and heat cured in order to form a final product. R. C. Valore, Jr. in an article in the *ACI Journal* of November, 1956, discussed foamed concrete produced by controlled mixing of mixtures containing gas forming chemicals such as hydrogen peroxide and calcium hypochlorite (ref page 512).

The above-referenced Japanese Pat. No. 1970-51512 (Public Patent Request Notice 50-13297) issued to Nippon Peroxide Co. dislcoses the use of hydrogen peroxide as a foaming agent in a foamed concrete material that includes fly ash as an ingredient. However, it also includes cement and requires heat for curing and hypochlorite as a foaming retarder.

While there are a number of attempts in the prior art to utilize fly ash in the production of an inexpensive, light weight, insulating cementitious building material, none of those approaches have been able to achieve that result without the use of heat or the addition of Portland cement or a functional equivalent, such as calcium silicate or crushed lime, and other more expensive additives, such as amphoretic metals, aluminum hydroxide, magnesium or barium, carbonate, etc.

The within invention is an improvement over prior art in that it uses a combination of foaming agent, air entrainer, and a minimum of low cost bonding agent in order to produce a material with good utility and no requirement for heat curing or critical mixing procedures. The invention thereby provides increased utility for on-site fabrication and reduces manufacturing costs for pre-formed articles.

Accordngly, it is a general object of the present invention to provide a method of making an inexpensive light weight, insulating cementitious building material.

It is another object of the present invention to provide a practical utilitarian use for fly ash as an inexpensive building material.

It is a more specific object of this invention to provide a method of producing a light weight, insulating cemetitious building material utilizing fly ash as the principle hydraulically setting cementitious material, but without the necessity of using heat, hot water, or expensive preparations and additives that complicate the process and drive up the cost.

Additional objects, advantages and novel features of the invention shall be set forth in part in the description that follows, and in part will become apparent to those skilled in the art upon examination of the following or may be learned by the practice of the invention. The object and the advantages of the invention may be realized and attained by means of the instrumentalities and in combinations particularly pointed out in the appended claims.

The present invention provides a novel process and product in that the mix comprises fly ash, water, bonding agent, air entrainer, and a chemical foaming agent consisting of either an oxygen-producing agent such as hydrogen peroxide; or a carbon dioxide producing reaction such as sodium carbonate, sodium bicarbonate, or calcium carbonate and an acid such as acetic acid in a water solution. The components are mixed and allowed to foam and harden into a low density masonry like material which has insulating properties and is resistant to freezing, fire, thermal shock, and moisture. It is suitable for such applications as structural elements of buildings, either precast or formed in place; for thermal insulation; or for use as a lightweight aggregate. The material can also be applied as an insulating coating on existing structures.

Additives or optional components may be used with the basic recipe to accelerate or retard the setting time, to increase the early strength or final strength or both, to improve water resistance, or to vary the appearance of the final product. Fabrication procedures and additives suitable for ordinary concrete generally are suitable for use with the composition disclosed herein.

DETAILED DESCRIPTION OF PROPOSED INVENTION

The invention described herein is a building material which typically has the appearance of concrete, and can be used and fabricated much like ordinary concrete, which uses and fabrication techniques are known to persons having ordinary skill in the art of fabricating and using concrete. Its primary component, however, is fly ash, which is mixed with a water solution, foamed, and bonded to produce a low density material having thermal insulating properties.

The essence of the invention is the combination of fly ash with a chemical foaming agent, a bonding agent, an air entrainer, and water in the preferred proportions and concentrations described below in order that the combination will retain gas bubbles in a uniform dispersion until it hardens. In order to adequately examine the contribution that each component makes to the final product, it is necessary to consider each of the individual components in detail:

FLY ASH

Fly ash is described in ANSI/ASTM C618-77 paragraph 4.2 as: "Finely divided residue that results from the combustion of powdered coal." The ANSI/ASTM specification describes two classes of fly ash for use as a mineral admixture in Portland cement concrete. Class F fly ash is normally produced by burning anthracite or bituminous coal. It is described as having pozzolanic properties. Class C fly ash is normally produced by burning lignite or subbituminous coal. It has more cementitious properties than Class F fly ash, primarily due to its higher lime content, which can exceed 10%. Because of the more cementitious properties of Class C fly ash, it bonds more strongly than Class F fly ash when combined with water and allowed to harden. The cementitious nature of Class C fly ash makes it more suitable for use in this invention, but Class F fly ash is suitable if it is used in combination with Portland cement. The volume of Portand cement should be about 5% to 25% of the volume of the Class F fly ash. The quantity of cement required depends on the strength required for the final product and on the properties of the fly ash that is used.

WATER

Sufficient water should be used to form a workable paste with the fly ash and other components. The volume of water required is about 30% to 60% of the volume of dry material. Typically, water in the amount of 50% of the volume of dry material will provide a good mix.

For convenience in handling and mixing it has been found practical to prepare the material in two components, with the dry solids mixed together as one component, and the water soluble materials combined as a liquid component. The dry solids and liquid components can then be mixed together using mechanical mixing techniques known to persons skilled in the art of producing concrete. When hydrogen peroxide is used as a foaming agent, it should always be handled and used in a water solution. The other components that may be premixed in the water solution include the bonding agent and the air entrainer. Both of these agents have been found to be compatible with hydrogen peroxide in a water solution. If an aqueous acid is to be used as a chemical foaming agent in place of hydrogen peroxide, it should also be suitable for handling in a water solution. As with Portland cement concrete, the temperature of the materials may have some influence on the setting time, early strength, and final strength of the product. For this reason, the components should be mixed and cured within a temperature range that would be considered reasonable for Portland cement concrete. Additionally, if hydrogen peroxide solution is used as the foaming agent, may become unstable and lose its strength when it is stored at high temperatures.

FOAMING AGENT

Hydrogen peroxide is the preferred foaming agent, although a number of other foaming agents may be used, and are discussed in cement industry literature and in prior patents. The hydrogen peroxide is stored and handled in a water solution containing 3% or less hydrogen peroxide. It may be used at this concentration to provide the necessary liquid to form a paste with the dry materials, or it may be diluted with water to a concentration as low as about 0.5% hydrogen peroxide (by weight in water). The advantage of using hydrogen peroxide solution as a foaming agent is that it forms a more uniform distribution of bubbles in the mixture than other chemical agents. The dispersion and uniform entrainment of bubbles is important to provide small, uniform cells in the final product. These small uniformly dispersed cells are important to give the product its good insulating qualities and final strength. The foaming action of hydrogen peroxide is more even and long lasting that is provided by most acid-base reactions, and this factor helps reduce the need for a critical mixing process. The density of the final product can be adjusted to some extent by varying the concentration of the hydrogen peroxide solution within the 0.5% to 3% range noted above.

Another chemical foaming agent considered suitable for use in this invention is the combination of an aqueous acid with a base that releases carbon dioxide when reacted with an acid. The preferred carbon dioxide releasing agents are sodium carbonate, sodium bicarbonate, and calcium carbonate. Acid base components should be used sparingly, however, to avoid excess foaming and weakening of the final product by introducing undesirable byproducts. Amphoteric metal powders have also been used in the past to provide a foaming action in compositions of fly ash or concrete.

BONDING AGENT

A water miscible bonding agent is used in the composition to add strength and stability to the final product. There are several bonding agents available for use in concrete which are suitable for use with this invention, marketed commercially as concrete bonding or concrete binding preparations. These preparations are intended to increase the tensile strength or shear strength of concrete or to increase the strength of a bond between new concrete and an existing surface. The choice of a bonding or binding agent should be made with the object of achieving the following properties in the final product: good early strength and final strength, good stability of the entrained bubbles, moisture resistance, and resistance to fire and high temperature. Sodium silicate in a water solution is suitable for this purpose, and has appeared in prior patents as a bonding agent for compositions containing fly ash. The preferred bonding agent for the material of this invention is catalyzed polyvinyl acetate resin, which is manufactured and marketed under the trade name of Weldbond by Frank T. Ross and Sons Inc. Weldbond is a water miscible liquid which is compatible with hydrogen peroxide in water solution, and which is used in a proportion of one part Weldbond per 5 to 20 parts of water, or water solution containing hydrogen peroxide. A typical mixture of components would contain catalyzed polyvinyl acetate resin (Weldbond) in a proportion of 1:10 with the water solution. In addition to contributing strength and resistance to water and thermal stress, the Weldbond appears to contribute to the formation of small, uniform, well dispersed bubbles in the product, which in turn improves it insulating properties.

Sugar or forms of sugar such as syrup and molasses can be used as a bonding agent, or can be added to contribute to the bonding of the material. Sugars have shown to increase the compressive strength of the product considerably, but should be used in quantities of about 3% or less (by weight, compared with the weight of the dry materials), because excess sugar can be expected to reduce the final strength significantly.

AIR ENTRAINER

Like the bonding agent, air entrainer may be considered to be an agent which is generally known and used in the concrete industry. Air entrained concrete is commonly used to reduce or eliminate problems caused to concrete by repeated freezing and thawing. Prior applications have used air entrained concrete containing small percentages of air to prevent freeze damage by allowing space for expansion of the ice as it freezes. Foamed concrete has also been used in the past which contains air entrainer in the mix. In the past, foamed concrete has generally been formed either mixing the materials as a high or medium speed under controlled conditions, or by spraying the concrete mixture together with air or gas from a foam gun.

A type of air entrainer that has been used successfully in the material of this invention is marketed commercially under the trade name Protex AES. It is a liquid which can be added to the water solution in an amount of 0.1% to 2% by volume. A typical, or preferred, mixture would use the Protex AES in an amount equal to 2% of the liquid volume.

OPTIONAL COMPONENTS

Experiments indicate that almost any additive or component which is suitable for use in Portland cement concrete can be used in the material of this invention. Some components, however, should be mentioned as being particularly useful.

Portland cement or similar products can be used to increase strength of the final product, or to add to the early strength. As mentioned above, when Class F fly ash is used as the major raw material, Portland cement should be added to it in order to improve the bonding properties, because Class F fly ash does not have significant cementitious qualities of its own. In addition, cement may be useful to modify the setting time of the mixture. Fly ash mixtures generally will reach an initial set very quickly. Several types of Portland cement (types I, II, IV, and V) have been shown to retard the initial set to some degree, while type III accelerated the initial set in at least one test.

Sodium silicate, also mentioned above, can be used to improve final strength, and is useful for improving several other properties, including water resistance and fire resistance. Sodium silicate can be substituted in some instances for part of the bonding agent or part of the air entrainer. It can also be used to accelerate the initial setting time.

Calcium carbonate can be used in small amounts (1% or less of the dry solids) to improve the foaming action of the hydrogen peroxide.

Calcium oxide, either anhydrous or slaked, can be added to improve final strength of the material by improving the cementitious property of the fly ash. It also can be used to neutralize excess acidity in the mixture which might later cause corrosion of metal surfaces or reinforcement in contact with the hardened material. The quantity used should be sufficient to bring the pH of the wet mixture to the neutral point (7.0).

Finally, calcium stearate or aluminum stearate may be used to improve the resistance of the material to prolonged or continuous moisture.

FABRICATION TECHNIQUES

The material of this invention may be handled, mixed, and formed much like ordinary concrete, although as noted above, it may have a shorter time until its initial set, unless it is retarded by some means. Curing time and temperatures which are suitable for Portland cement concrete should be also be suitable for the material disclosed herein. The material can be precast, formed in place, or blown or sprayed onto surfaces with the proper equipment. Its relatively light weight makes it easier to transport and erect than ordinary concrete.

The foregoing is illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as defined by the claims which follow.

We claim:

1. A lightweight, insulating building material produced by the method comprising the steps of:
   preparing a mixture consisting essentially of:
   (a) Type C fly ash;
   (b) water, equal to 30% to 60% of the volume of said fly ash;
   (c) hydrogen peroxide in solution with the water at a concentration in the range of 0.5% to 3.0% by weight;
   (d) a water miscible bonding agent; and
   (e) an air entrainer; and
   allowing the mixture to foam and harden at ambient temperature.

2. A lightweight, insulated building material produced by the method comprising the steps of:
   preparing a mixture consisting essentially of:
   (a) Type C fly ash;
   (b) water, equal to 30% to 60% of the volume of said fly ash;
   (c) an aqueous acid;
   (d) a base selected from the group consisting of sodium carbonate, sodium bicarbonate, and calcium carbonate;
   (e) a water miscible bonding agent; and
   (f) an air entrainer; and
   allowing the mixture to foam and harden at ambient temperature.

3. The material of claim 2 wherein the bonding agent is catalyzed polyvinyl acetate resin, in an amount equal to 5% to 20% of the volume of the water.

4. The method of producing a lightweight, insulating construction material, comprising the steps of:
   preparing a mix consisting essentially of Type C fly ash, water in the range of about 40% to 60% of the volume of said fly ash, hydrogen peroxide foaming agent at a concentration in the range of 0.5% to 3.0% by weight of the water, a bonding agent, and an air entraining agent; and
   curing the mix at ambient temperature.

5. The method of claim 4, including the step of placing the mix in a desired form prior to curing.

6. The method of claim 4, including the step of blowing the mix under pressure onto a surface prior to curing.

7. The method of claim 4, including the step of using a polyvinyl acetate resin as the bonding agent in a concentration in the range of one part of polyvinyl acetate resin to 5-20 parts of water.

8. The method of producing a lightweight, insulating construction material, comprising the steps of:
   preparing a mix consisting essentially of of Type C fly ash, water in the range of about 40% to 60% of the volume of said fly ash, hydrogen peroxide foaming agent at a concentration in the range of 0.5% to 3.0% by weight of the water, a bonding agent, and an air entraining agent;
   placing the mix in its desired form as a construction material; and
   curing the mix at ambient temperature.

* * * * *

UNITED STATES PATENT AND TRADEMARK OFFICE
CERTIFICATE OF CORRECTION

PATENT NO. : 4,659,385

DATED : April 21, 1987

INVENTOR(S) : Costopoulos et al.

It is certified that error appears in the above-identified patent and that said Letters Patent is hereby corrected as shown below:

In the Title, change "MANUFACTURING" to --MANUFACTURED--.

In column 5, line 60, change "it" to --its--.

Signed and Sealed this

Eighth Day of September, 1987

Attest:

DONALD J. QUIGG

*Attesting Officer*     Commissioner of Patents and Trademarks